(12) United States Patent
Kurahashi et al.

(10) Patent No.: US 11,796,441 B2
(45) Date of Patent: Oct. 24, 2023

(54) INSPECTION METHOD AND INSPECTION SYSTEM FOR PILLAR-SHAPED HONEYCOMB STRUCTURE

(71) Applicant: NGK INSULATORS, LTD., Nagoya (JP)

(72) Inventors: Ryota Kurahashi, Nagoya (JP); Yoshihiro Sato, Nissin (JP); Takafumi Terahai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 351 days.

(21) Appl. No.: 17/128,392

(22) Filed: Dec. 21, 2020

(65) Prior Publication Data

US 2021/0302298 A1  Sep. 30, 2021

(30) Foreign Application Priority Data

Mar. 27, 2020  (JP) .................................. 2020-058378

(51) Int. Cl.
*G01J 4/00* (2006.01)
*G01N 15/08* (2006.01)

(52) U.S. Cl.
CPC ......... *G01N 15/08* (2013.01); *G01N 15/0806* (2013.01); *G01N 2015/084* (2013.01); *G01N 2015/0846* (2013.01)

(58) Field of Classification Search
CPC ..... G01N 2015/084; G01N 2015/0846; G01N 15/08; G01N 15/0806; G01N 21/8851; G01N 21/55; G01N 21/59; G01N 21/8803; G01N 21/954; G01N 2021/558; G06T 7/0004; G06T 7/521; G06T 7/70; G06T 2207/30164

USPC .......... 356/237.1–237.6; 250/559.16, 559.42
See application file for complete search history.

(56) References Cited

U.S. PATENT DOCUMENTS

| 7,701,570 | B2 | 4/2010 | Gargano et al. |
| 11,499,921 | B2* | 11/2022 | Kurahashi .......... G01N 21/8851 |
| 2007/0091309 | A1* | 4/2007 | Kondo .................. G06T 7/0004 |
| | | | 356/364 |
| 2007/0132988 | A1 | 6/2007 | Gargano et al. |

(Continued)

FOREIGN PATENT DOCUMENTS

| JP | 2004-037248 A | 2/2004 |
| JP | 2013-061314 A | 4/2013 |

(Continued)

OTHER PUBLICATIONS

Japanese Office Action (with English translation) dated Aug. 30, 2022 (Application No. 2020-058378).

*Primary Examiner* — Hoa Q Pham
(74) *Attorney, Agent, or Firm* — BURR PATENT LAW, PLLC

(57) ABSTRACT

A method for inspecting a pillar-shaped honeycomb structure including the steps of: imaging a pattern of transmitted light from the second end face according to arrangement of the plugged portions of first cells and second cells, with a camera via a light diffusing film placed parallel to a second end face of the pillar-shaped honeycomb structure in a non-contact state with the second end face, which pattern is obtained by irradiating a first end face with light; and detecting a defective plugged portion(s) of the second cells based on an image of the pattern of transmitted light imaged with the camera.

14 Claims, 7 Drawing Sheets

(56) References Cited

U.S. PATENT DOCUMENTS

2011/0048109 A1* 3/2011 Suman ............ G01N 21/95692
                                                              73/40
2017/0031156 A1    2/2017  Uchida et al.

FOREIGN PATENT DOCUMENTS

| JP | 2014-211366 A | 11/2014 |
| JP | 2019040065 A * | 3/2019 |
| WO | 2015/155993 A1 | 10/2015 |

* cited by examiner

INSPECTION METHOD AND INSPECTION SYSTEM FOR PILLAR-SHAPED HONEYCOMB STRUCTURE

FIELD OF THE INVENTION

The present invention relates to an inspection method and an inspection system for a pillar-shaped honeycomb structure.

BACKGROUND OF THE INVENTION

An exhaust gas emitted from an internal combustion engine such as diesel engines contains a large amount of carbon-based particulates (particulate matters) that cause environmental pollution. Therefore, in general, an exhaust system of a diesel engine or the like is equipped with a filter (Diesel Particulate Filter: DPF) for collecting the particulates. In recent years, the particulates emitted from gasoline engines have also become a problem, and the gasoline engines have also been equipped with a filter (Gasoline Particulate Filter: GPF).

Known as a filter is a wall flow type pillar-shaped honeycomb structure including: a plurality of first cells extending in a height direction from a first end face to a second end face, the first end face being opened and the second end face having plugged portions; and a plurality of second cells arranged adjacent to the first cells across a partition wall and extending from the first end face to the second end face in the height direction, the first end face having plugged portions and the second end face being opened.

In a filter having a pillar-shaped honeycomb structure having plugged portions, the plugged portions play a role of preventing captured particulate matters from leaking out of the filter. Therefore, it is important to form the plugged portions at predetermined positions with a predetermined depth, in terms of ensuring filter performance.

Thus, Patent Literature 1 (U.S. Pat. No. 7,701,570) proposes an inspection method and system for a pillar-shaped honeycomb structure having plugged portions. It discloses a method of detecting a defective plugged portion in a pillar-shaped honeycomb structure, comprising the steps of launching collimated light into a first end face of the pillar-shaped honeycomb structure having plugged portions; receiving the light with a translucent projection medium that contacts the second end face of the pillar-shaped honeycomb structure, wherein the light is visualized as a light spot on the projection medium.

CITATION LIST

Patent Literatures

[Patent Literature 1] U.S. Pat. No. 7,701,570

SUMMARY OF THE INVENTION

Patent Literature 1 proposes a method of detecting a defective plugged portion by receiving collimated light launched into the first end face while contacting the projection medium with the second end face of the pillar-shaped honeycomb structure. However, the contacting of the projection medium with the second end face of the pillar-shaped honeycomb structure for inspection of the plugged portions may damage the projection medium. If the projection medium is damaged, the inspection accuracy may be impaired, so it is necessary to replace the projection medium with a new one. However, since the replacement of the projection medium leads to an increase in inspection cost, it is desirable to be able to use the projection medium for a period of time as long as possible.

Thus, there is still room for improvement in terms of convenience in the conventional inspection method for the pillar-shaped honeycomb structure having the plugged portions. The present invention has been made in view of the above circumstances. In an embodiment, an object of the present invention is to provide an inspection method with improved convenience for a pillar-shaped honeycomb structure having plugged portions. In another embodiment, an object of the present invention is to provide an inspection system with improved convenience for a pillar-shaped honeycomb structure having plugged portions.

[1]

A method for inspecting a pillar-shaped honeycomb structure, the pillar-shaped honeycombs structure comprising: an outer peripheral side wall; a plurality of first cells arranged on an inner peripheral side of the outer peripheral side wall, each of the first cells extending from a first end face to a second end face, the first end face being opened and the second end face having plugged portions; and a plurality of second cells arranged on the inner peripheral side of the outer peripheral side wall, each of the second cells extending from the first end face to the second end face, the first end face having plugged portions and second end face being opened, the first cells and the second cells being alternately arranged adjacent to each other interposing a partition wall therebetween, the method comprising the steps of:

imaging a pattern of transmitted light from the second end face according to arrangement of the plugged portions of the first cells and the second cells, with a camera via a light diffusing film placed parallel to the second end face in a non-contact state with the second end face, which pattern is obtained by irradiating the first end face with light; and detecting a defective plugged portion(s) of the second cells based on an image of the pattern of transmitted light imaged with the camera.

[2]

The method according to [1], wherein the light diffusing film has a diffusion angle of from 10° to 90°.

[3]

The method according to [1] or [2], wherein the light diffusing film has a thickness of 50 mm or less.

[4]

The method according to any one of [1] to [3], wherein the step of imaging the pattern with the camera is carried out under at least one of the following conditions (a) to (c):

(a) tensile stress is applied to the light diffusing film;
(b) the light diffusing film is sandwiched between two transparent plates; and
(c) the light diffusing film is attached to a transparent plate.

[5]

The method according to any one of [1] to [4], wherein a distance between the light diffusing film and the second end face is from 1 mm to 100 mm.

[6]

The method according to any one of [1] to [5], wherein the light with which the first end face is irradiated is diffused light.

[7]

The method according to any of [1] to [6], wherein the light with which the first end face is irradiated is emitted from a light source facing the first end face and spreading over an area larger than that of the first end face.

[8]

The method according to any one of [1] to [7], wherein the light with which the first end face is irradiated is emitted from a light source that is in contact with the pillar-shaped honeycomb structure.

[9]

The method according to any one of [1] to [7], wherein the light with which the first end face is irradiated is emitted through a translucent substrate arranged between the pillar-shaped honeycomb structure and the light source.

[10]

A system for inspecting a pillar-shaped honeycomb structure, the pillar-shaped honeycombs structure comprising: an outer peripheral side wall; a plurality of first cells arranged on an inner peripheral side of the outer peripheral side wall, each of the first cells extending from a first end face to a second end face, the first end face being opened and the second end face having plugged portions; and a plurality of second cells arranged on the inner peripheral side of the outer peripheral side wall, each of the second cells extending from the first end face to the second end face, the first end face having plugged portions and second end face being opened, the first cells and the second cells being alternately arranged adjacent to each other interposing a partition wall therebetween, the system comprising:

a light irradiator for irradiating the first end face with light;

a light diffusing film to be arranged in parallel to the second end face in a non-contact state with the second end face; and a camera for imaging, via the light diffusing film, a pattern of transmitted light from the second end face according to arrangement of each of the plugged portions of the first cells and the second cells, which pattern is obtained by irradiating the first end face with the light.

[11]

The system according to [10], wherein the light diffusing film has a diffusion angle of from 10° to 90°.

[12]

The system according to [10] or [11], wherein the light diffusing film has a thickness of 50 mm or less.

[13]

The system according to any one of [10] to [12], wherein the system comprises at least one of the following parts (a) to (c):

(a) a tensioner for applying tensile stress to the light diffusing film, the tensioner comprising at least one pair of grippers;

(b) two transparent plates for sandwiching the light diffusing film; and (c) a transparent plate for attaching the light diffusing film.

[14]

The system according to any one of [10] to [13], wherein the camera is configured to image the pattern of transmitted light from the second end face under a condition that a distance between the light diffusing film and the second end face is from 1 mm to 100 mm.

According to an embodiment of the present invention, it is possible to inspect the pillar-shaped honeycomb structure having the plugged portions for the presence or absence of defects in the plugged portions without damaging the light diffusing film as a projection medium. This can result in decreased frequency of replacement of the light diffusing film, thereby suppressing an increase in the workload required for replacing the light diffusing film and an increase in inspection cost. Further, the use of the light diffusing film as the projection medium can provide an advantage that the defects in the plugged portions can be easily detected even if the squareness of the pillar-shaped honeycomb structure is poor.

DETAILED DESCRIPTION OF THE INVENTION

Embodiments according to the present invention will now be described in detail with reference to the drawings. It should be understood that the present invention is not intended to be limited to the following embodiments, and any change, improvement or the like of the design may be appropriately added on the basis of ordinary knowledge of those skilled in the art without departing from the spirit of the present invention.

(1. Pillar-Shaped Honeycomb Structure)

Figure 2:
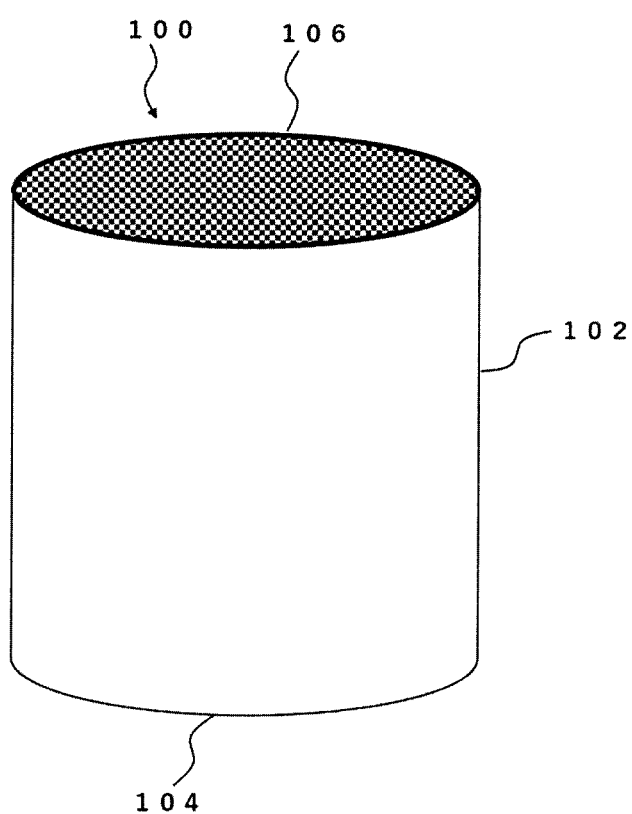
FIG. 2 is a perspective view schematically showing a wall-flow type ceramic fired body.
Figure 3:
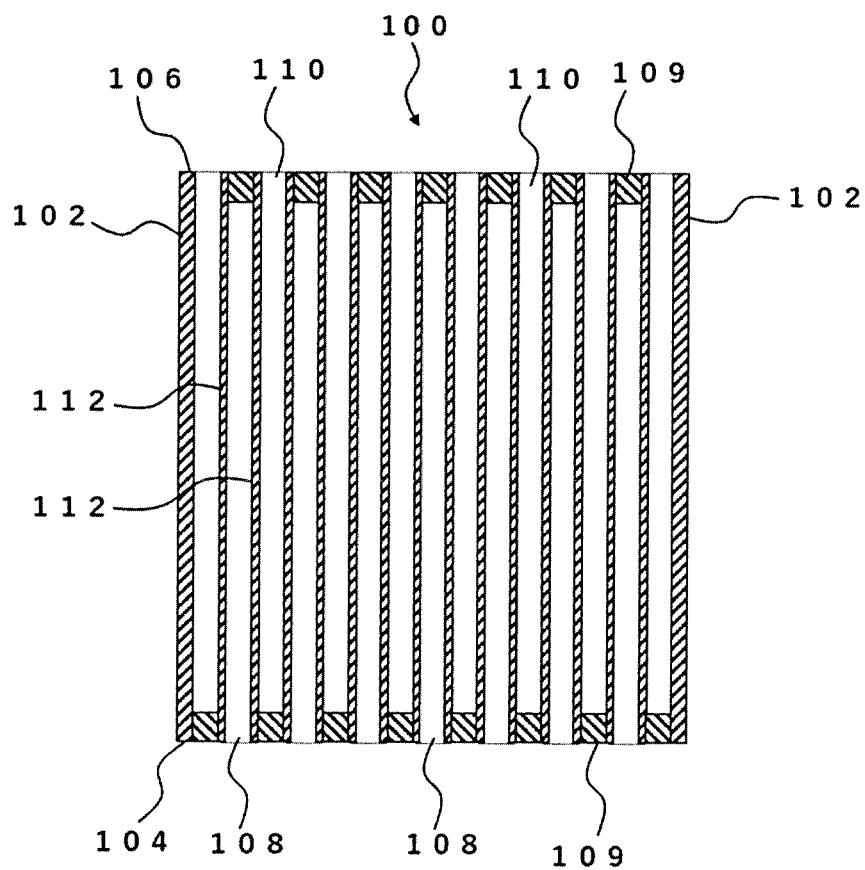
FIG. 3 is a schematic cross-sectional view of a wall-flow type ceramic fired body as observed from a direction orthogonal to a cell extending direction.

FIGS. 2 and 3 illustrate a schematic perspective view and a cross-sectional view of a pillar-shaped honeycomb structure (100) applicable as a wall-flow type automobile exhaust gas filter and/or a catalyst support, respectively. The pillar-shaped honeycomb structure (100) includes: an outer peripheral side wall (102); a plurality of first cells (108) arranged on an inner peripheral side of the outer peripheral side wall (102), each of the first cells (108) extending from a first end face (104) to a second end face (106), the first end surface (104) being opened and the second end face (106) having plugged portions (109); and a plurality of second cells (110) arranged on the inner peripheral side of the outer peripheral side wall (102), each of the second cells (110) extending from the first end face (104) to the second end face (106), the first end face (104) having plugged portions (109), and the second end face (106) being opened. In the pillar-shaped honeycomb structure (100), the first cells (108) and the second cells (110) are alternately arranged adjacent to each other interposing a partition wall (112) therebetween.

When an exhaust gas containing particulate matters such as soot is fed to the first end face (104) on an upstream side of the pillar-shaped honeycomb structure (100), the exhaust gas is introduced into the first cells (108) and proceeds in the first cells (108) toward the downstream. Since the first cells (108) are plugged on the second end face (106) on the downstream side, the exhaust gas passes through the porous partition walls (112) partitioning the first cell (108) from the second cell (110), and flows into the second cells (110). Since the particulate matters cannot pass through the partition walls (112), they are collected and deposited in the first cells (108). After the particulate matters are removed, the clean exhaust gas that has flowed into the second cells (110) proceeds toward the downstream in the second cells (110) and flows out of the second end face (106) on the downstream side.

Examples of shapes of the end faces of the pillar-shaped honeycomb structure include, but not limited to, a polygonal shape or irregular shape such as a circular shape, an elliptical shape, a race track shape, an oval shape, a triangular shape, a substantially triangular shape, a quadrangular shape, and a substantially quadrangular shape. The illustrated pillar-shaped honeycomb structure (100) has circular end faces and has a cylindrical shape as a whole.

Examples of shapes of the cells in the cross-section perpendicular to the flow path direction of the cells include, but not limited to, preferably a quadrangle, a hexagon, an octagon, or a combination thereof. Among them, a square and hexagon are preferred. Such a cell shape results in a decreased pressure loss when the fluid passes through the honeycomb fired body, so that purification performance of a catalyst can be improved.

A cell density (the number of cells per unit cross-sectional area) is not particularly limited, and it may be, for example, from 6 to 2000 cells/square inch (from 0.9 to 311 cells/cm$^2$). Here, the cell density is calculated by dividing the number of cells on one end face (including the plugged cells) by the area of the end face excluding the outer peripheral side wall.

There is no limitation for the thickness of the partition wall (112), and the thickness may be, for example, from 50 μm to 330 μm.

There is no limitation for the height (a length from the first end face to the second end face), and the height may be, for example, from 40 mm to 300 mm.

The pillar-shaped honeycomb structure having the plugged portions can be produced by a known production method, which will be described below as an example. First, a raw material composition containing a ceramic raw material, a dispersion medium, a pore former and a binder is kneaded to form a green body. The green body is then extruded to form a desired pillar-shaped honeycomb structure. After the pillar-shaped honeycomb structure is dried, the plugged portions are formed on both end faces of the pillar-shaped honeycomb structure, and the plugged portions are then dried to obtain a pillar-shaped honeycomb structure having the plugged portions. After that, the pillar-shaped honeycomb structure is generally subjected to degreasing and firing to be provided as a ceramic fired body. The inspection of the plugged portions may be carried out for the pillar-shaped honeycomb structure before firing, or may be carried out for the pillar-shaped honeycomb structure after firing.

(2. Inspection System and Inspection Method)

According to an embodiment of the present invention, an inspection system and an inspection method for the pillar-shaped honeycomb structure (100) are provided. FIGS. 1A to 1D show schematic side views for explaining a configuration of an inspection system (10) according to each embodiment of the present invention.

The inspection system (10) includes:
a light irradiator (12) for irradiating the first end face (104) of the pillar-shaped honeycomb structure (10) with light;
a light diffusing film (14) to be arranged in parallel to the second end face (106) in a non-contact state with the second end face (106); and
a camera (16) for imaging, via the light diffusing film (14), a pattern of transmitted light from the second end face (106) according to arrangement of each of the plugged portions (109) of the first cells (108) and the second cells (110), which pattern is obtained by irradiating the first end face (104) with the light.

In an embodiment, the inspection system (10) can include a housing (13) for accommodating the light irradiator (12), the light diffusing film (14), the camera (16), and the pillar-shaped honeycomb structure (100). The housing (13) can be configured to block light from the outside. This can allow the inspection to be performed in a dark environment, thereby improving the inspection accuracy.

The light irradiator (12) is disposed at a position where it can irradiate the first end face (104) of the pillar-shaped honeycomb structure (100) with light. In the inspection system (10) according to the illustrated embodiment, the light irradiator (12) is configured to be able to irradiate it with light upward. The system is configured to arrange the pillar-shaped honeycomb structure (100) directly above a light source of the light irradiator (12) such that the first end face (104) is located on the lower side.

A light source (12a) of the light irradiator (12) includes, but not particularly limited to, an LED, an incandescent light bulb, and a halogen lamp. These light sources can generally irradiate with diffused light. In terms of uniformly irradiating the first end face (104) with the light, the light source facing the first end face (104) preferably spreads over an area larger than that of the first end face (104), although it depends on a diffusion angle of the light from the light source (12a) and a distance from the first end face. A wavelength of the light to be irradiated is also not particularly limited as long as it is a wavelength at which the camera has a light receiving sensitivity. Therefore, it is also possible to irradiate with white light. An output of the light to be irradiated is also not particularly limited, but a higher output is preferable, because the higher output can allow the transmitted light intensity to be ensured for a short exposure time even if the height of the pillar-shaped honeycomb structure (100) is large and the plugged portions are deep, or the influence of disturbance to be reduced. For example, the light irradiation can be performed with an output such that an illuminance of the first end face (104) is 10,000 lx or more.

In Patent Literature 1, a collimator lens is arranged between the light irradiator (12) and the pillar-shaped honeycomb structure (100) such that collimated light can be obtained. On the other hand, in the present embodiment, it is not necessary to use the collimated light. Therefore, in one embodiment of the present invention, the collimator lens is not arranged between the light irradiator (12) and the pillar-shaped honeycomb structure (100). Therefore, in one embodiment, the pillar-shaped honeycomb structure (100) may be placed so as to be in contact with the light source (12a) of the light irradiator (12) (see FIGS. 1A to 10). The contact of the pillar-shaped honeycomb structure (100) with the light source is advantageous in terms of the intensity of transmitted light and the uniformity of light.

Figure 1A:
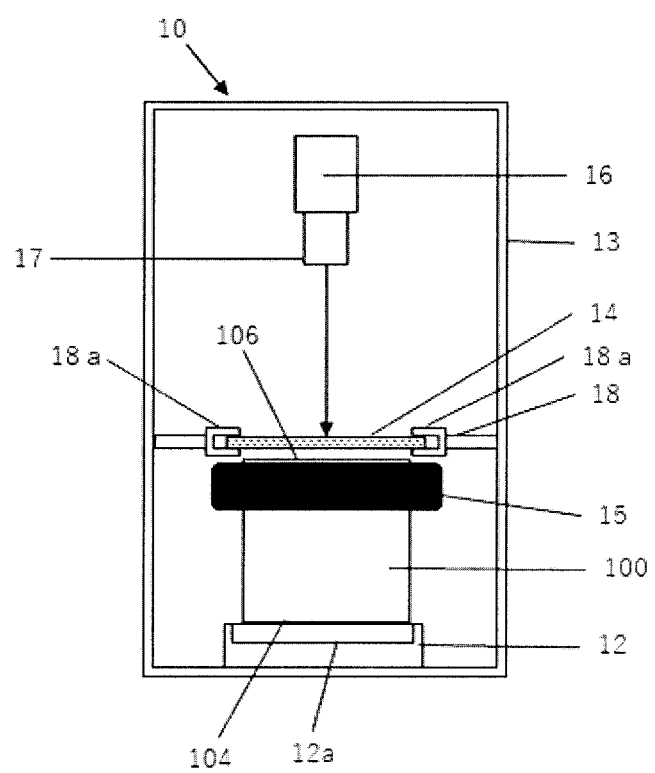
FIG. 1A is a schematic side view for explaining a configuration of an inspection system according to an embodiment of the present invention.
Figure 1B:
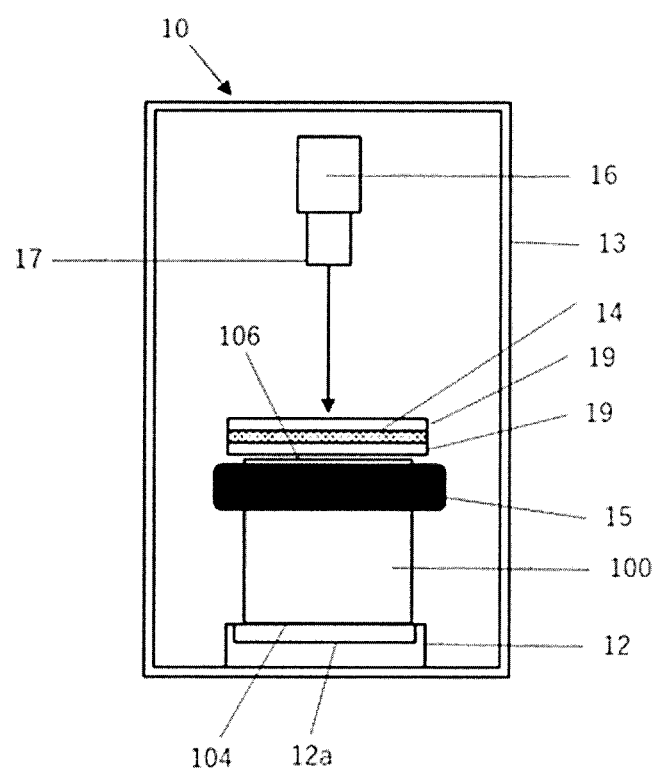
FIG. 1B is a schematic side view for explaining a configuration of an inspection system according to another embodiment of the present invention.
Figure 1C:
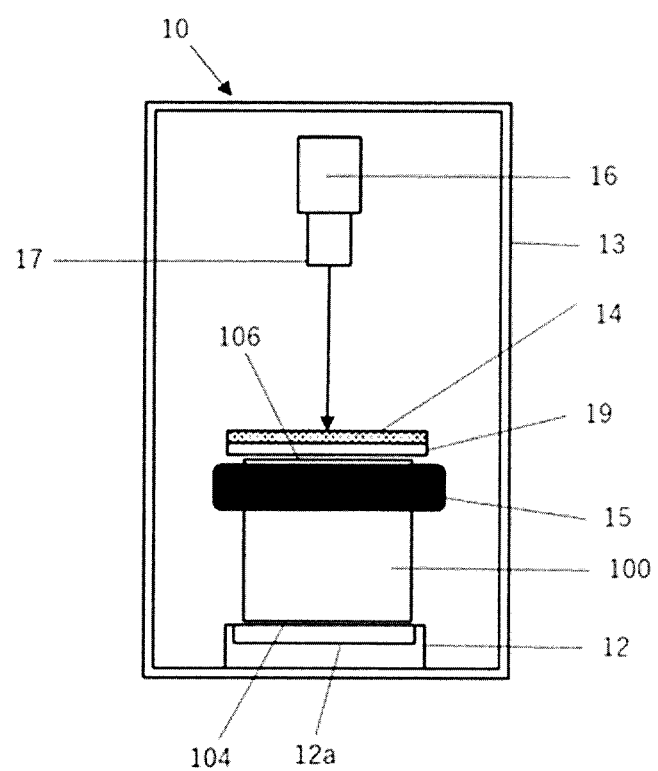
FIG. 1C is a schematic side view for explaining a configuration of an inspection system according to still another embodiment of the present invention.
Figure 1D:
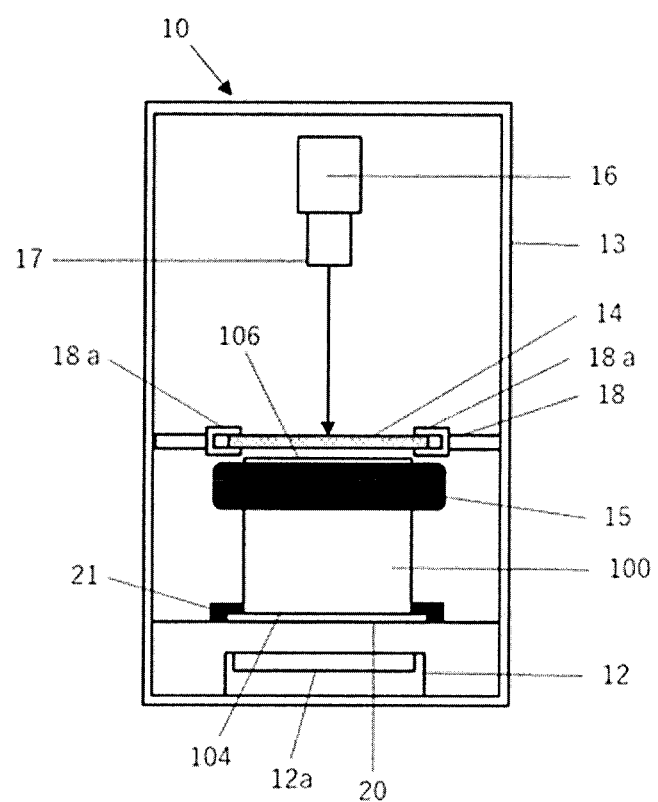
FIG. 1D is a schematic side view for explaining a configuration of an inspection system according to yet another embodiment of the present invention.

Further, in another embodiment, to prevent the pillar-shaped honeycomb structure (100) from being contacted with the light source (12a), a translucent substrate (20) may be sandwiched between the pillar-shaped honeycomb structure (100) and the light source (12a) (see FIG. 1D). Examples of the translucent substrate (20) include a transparent substrate and a semitransparent substrate. The semi-transparent substrate such as frosted glass is preferable because it eliminates non-uniformity of light from the light source. The irradiation of the first end face (104) with the light can be performed in a state where the pillar-shaped honeycomb structure (100) is placed on the translucent substrate (20). Further, in order to prevent the light passing through the translucent substrate (20) from illuminating the outer peripheral side wall (102) of the honeycomb structure (100), a ring-shaped light shielding member (21) surrounding the outer peripheral portion of the translucent substrate (20), which protrudes from the outer peripheral side wall (102) of the honeycomb structure (100), may be arranged. The light shielding member (21) is effective regardless of the presence or absence of a light shielding annular member (15) such as a balloon chuck, as described later.

The light diffusing film (14) is configured such that it can be arranged parallel to the second end face (106) in a non-contact state with the second end face (106) of the pillar-shaped honeycomb structure (100). Since the light diffusing film (14) is arranged in the non-contact state with the second end face (106) of the pillar-shaped honeycomb structure (100), the diffusing film (14) is not damaged by the contact with the second end face (106). The term "parallel" used in the phrase "the light diffusing film (14) is arranged parallel to the second end surface (106)" is a concept including mathematically exact parallel, as well as substantially parallel within a range that does not substantially affect the inspection accuracy. As an example, an average angle formed by the light diffusing film (14) and the second end face (106) of from 0° to 5° is included in the concept of parallel as used herein.

It is preferable that the light diffusing film (14) is arranged so as to cover the entire second end face (106), in terms of improving the inspection efficiency. Therefore, in one embodiment, an area of a main surface of the light diffusing film (14) is larger than that of the second end face (106) of the pillar-shaped honeycomb structure (100).

A distance between the light diffusing film (14) and the second end face (106) is not particularly limited. However, if it is too short, the light diffusing film (14) may be contacted with the second end face (106) due to vibration or the like. Therefore, the lower limit of the distance is preferably 1 mm or more, and more preferably 2 mm or more, and even more preferably 3 mm or more. Further, if the distance between the light diffusing film and the second end face is too long, the transmitted light from the adjacent cells overlaps, decreasing the inspection accuracy. Therefore, the upper limit of the distance is preferably 100 mm or less, and more preferably 30 mm or less, and even more preferably 15 mm or less. As used herein, the distance between the light diffusing film (14) and the second end face (106) refers to a length of a straight line extending in the normal direction from the center of gravity of the second end face (106) to a position where it reaches the light diffusing film (14).

The use of the light diffusing film (14) provides an advantage that a defective plugged portion(s) is/are easily detected even if the squareness of the pillar-shaped honeycomb structure (100) is poor due to the influence of dimensional error, i.e., the extending directions of the first end face (104) and the cells (108, 110) do not form a right angle, the extending directions of the second end face (106) and the cells (108, 110) do not form a right angle, or the extending direction of the cells are not straight but curved.

A diffusion angle of the light diffusing film (14) is preferably from 10° to 90°, and preferably from 20° to 60°, and even more preferably from 20° to 30°, in terms of improving the inspection accuracy by preventing the transmitted light of the adjacent cells from largely overlapping with each other. The diffusion angle of the light diffusing film (14) can be adjusted by, for example, a method of adding a light scattering medium into the film, a method of adjusting a surface roughness, or the like. As used herein, the diffusion angle of the light diffusing film (14) is defined as an angle at which brightness (illuminance) is reduced by half with respect to a direction showing the maximum brightness (illuminance) (the normal direction of the film surface) when the film surface is irradiated with white light. The angle at which the brightness (illuminance) is reduced by half can be identified by finding the angle at which the brightness is reduced by half provided that the position for irradiating the light diffusing film (14) with white light and the measurement distance are fixed, using an illuminometer equipped with a pinhole in front, which is sufficiently smaller than the white light irradiation range.

A thickness of the light diffusing film (14) is not particularly limited. However, if it is too thick, the transmitted light from the adjacent cells overlaps, decreasing the inspection accuracy. Therefore, the thickness is preferably 50 mm or less, and more preferably 3 mm or less, and even more preferably 1 mm or less. If the thickness of the light diffusing film (14) is too thin, the strength will be insufficient and wrinkles, bending, or breakage will tend to occur. Therefore, the thickness is preferably 0.2 mm or more, and more preferably 0.5 mm or more.

A material of the light diffusing film (14) is not particularly limited. However, it is preferable that the material be a rigid material so as not to cause wrinkles or bending in terms of performing a stable inspection. For example, glass and plastics (polycarbonate and the like) can be used.

In order to stably fix the light diffusing film (14) to the interior of the system, the inspection system can be provided with at least one of the following parts (a) to (c) in one embodiment:

(a) a tensioner for applying tensile stress to the light diffusing film, the tensioner including at least one pair of grippers;
(b) two transparent plates for sandwiching the light diffusing film; and
(c) a transparent plate for attaching the light diffusing film.

In the embodiment shown in FIG. 1A, the inspection system (10) includes a tensioner (18) having a pair of grippers (18a). For example, the tensioner (18) can be configured such that the pair of grippers (18a) can sandwich the opposite edges of the light diffusing film (14) and pull them in opposite directions. By applying the tensile stress to the light diffusing film (14), wrinkles and bending can be prevented even if the light diffusing film (14) is thin or soft, so that the stable inspection can be performed. Further, the tensioner (18) may include a second pair of grippers (18a) such that simultaneous pulling is also possible in the in-plane directions orthogonal to the pulling directions of the first pair of grippers (18a). This can allow the light diffusing film (14) to be pulled in four directions, so that the light diffusing film (14) can be more stably held.

In the embodiments shown in FIGS. 1A and 1D, each gripper (18a) has a clamp mechanism provided with a pair of grip plates facing each other with one above the other. In one embodiment, the tensioner (18) can include a driving means for transmitting both a pressing force for gripping the light diffusing film (14) and a tensile stress for outwardly pulling the light diffusing film (14) to the grippers (18a). The driving means may employ any known means. For example, a spring, an electric cylinder or the like can be used as the driving means for transmitting the pressing force, and a turnbuckle, an electric cylinder or the like can be used as the driving means for transmitting the tensile stress.

In the embodiment shown in FIG. 1B, the light diffusing film (14) is sandwiched from up and down directions by the two transparent plates (19). By sandwiching the light diffusing film (14) between the two transparent plates (19), wrinkles and bending can be prevented even if the light diffusing film (14) is thin or soft. Examples of the transparent plate (19) include, but not particularly limited to, a transparent glass plate and a transparent plastic plate (transparent polycarbonate plate, and the like). A thickness of the transparent plate (19) is generally thicker than that of the light diffusing film, and can be, for example, from 0.5 to 15 mm. A diffusion angle of the transparent plate (19) is generally 5° or less, typically 1° or less.

In the embodiment shown in FIG. 1C, the light diffusing film (14) is attached to the transparent plate (19). By attaching the light diffusing film (14) to the transparent plate (19), wrinkles and bending can be prevented even if the light diffusing film (14) is thin or soft. An example of a method of attaching the light diffusing film (14) to the transparent plate (19) includes a method of using a transparent adhesive. If the light diffusing film (14) is rigid and can ensure firmness, it may be sufficient to simply press the light diffusing film (14) against the transparent plate (19) by applying an external force. For instance, the light diffusing film (14) and the transparent plate (19) are attached together and their edges are sandwiched by a holder without using any adhesive. In the embodiment shown in FIG. 1C, the transparent plate (19) is arranged on a lower side of the light diffusing film, but the transparent plate (19) may be arranged on an upper side of the light diffusing film.

As the first end face (104) of the pillar-shaped honeycomb structure (100) is irradiated with the light from the light irradiator (12), the pattern of the transmitted light from the second end face (106) according to the arrangement of the plugged portions of the first cells (108) and the second cells (110) are projected on the light diffusing film (14).

The camera (16) is disposed at a position where the pattern of the transmitted light projected on the light diffusing film (14) can be imaged. In the inspection system (10) according to the illustrated embodiment, the camera (16) is arranged above, preferably directly above, the second end face (106) of the pillar-shaped honeycomb structure (100), and a lens (17) is directed toward the second end face (106), i.e., downward. The camera (16) may be either an area camera or a line camera, but the area camera is preferable because it has a fast imaging tact and a wider illumination width, and can allow an equipment size to be reduced. From the viewpoint of improving the inspection accuracy, the camera preferably has a pixel resolution of 100 μm/pix or less (which means that lengths of one pixel in the horizontal and vertical directions are 100 μm or shorter), in view of a general aperture area of each of the first cells (108) and the second cells (110).

The defective plugged portions of the second cells (110) can be detected based on the image of the transmitted light pattern generated by the camera (16). Specifically, the plugged portions (109) of the first cells (108) (that is, the plugged portions located on the second end face (106)) appear dark, and the plugged portions (109) of the second cells (110) (that is, the plugged portions located on the first end face (104)) appear bright because it is close to the light source. In this case, if there is/are a defect(s) in the plugged portions (109) of the second cells (110) due to a hole or insufficient depth, the defective plugged portion(s) has/have higher luminance than the normal plugged portions (109). On the contrary, when the plugged portions (109) of the second cells (110) are excessively deeply formed, the luminance is lower than the normal plugged portions (109).

The detection of the defective plugged portions (109) may be visually performed based on the image of the transmitted light pattern. Alternatively, the inspection system may be provided with a computer that can identify the positions of the plugged portions (109) of the second cells (110) based on the image of the transmitted light pattern to measure the luminance of the plugged portions (109) of the second cells (110), respectively, and automatically detect the plugged portions (109) of the second cells (110), which have luminance beyond a normal range of the luminance, as the defective plugged portions (109). The normal range of luminance in the normal plugged portions (109) of the second cells (110) can be preset and stored in a memory of the computer.

If the outer peripheral side surface (102) of the pillar-shaped honeycomb structure (100) is illuminated by the light from the light irradiator (12), the luminance of the plugged portions near the outer peripheral side surface (102) tends to be brighter, so that the inspection accuracy may be decreased. Therefore, when the pattern of the transmitted light from the second end face (106) is imaged by the camera (16), it is preferable that the outer peripheral side surface (102) of the pillar-shaped honeycomb structure (100) be circumferentially covered with a light shielding annular member (15). The light shielding annular member (15) is preferably made of an elastic material such as a rubber and an elastomer so as to flexibly correspond to the size of the pillar-shaped honeycomb structure (100).

Figure 4:
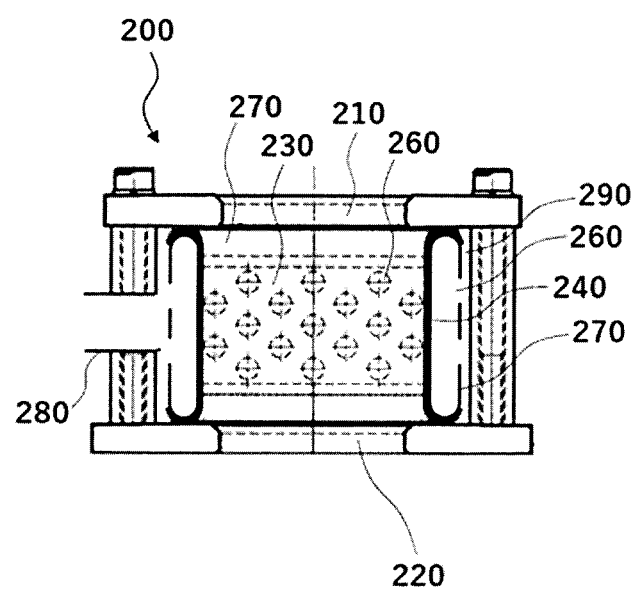
FIG. 4 is a schematic view showing a structural example of a balloon chuck.

As the light shielding annular member (15), a balloon chuck can be preferably used. When the balloon chuck is used, the pressing force from the balloon is easily dispersed over the entire contact surface with the pillar-shaped honeycomb structure (100), and a large pressure is not likely to be applied locally, so that the pillar-shaped honeycomb structure (100) is difficult to be damaged during fixing. FIG. 4 shows a structural example of a balloon chuck (200). The balloon chuck (200) includes: a first opening (210); a second opening (220); a hollow portion (230) between the first opening (210) and the second opening (220); and a balloon (240) disposed around the hollow portion (230). The balloon (240) is disposed so as to surround the hollow portion (230), and a plurality of balloons (240) may be disposed as required.

The balloon chuck (200) according to the illustrated embodiment includes a side wall (270) having a plurality of through holes (260) on the outer peripheral side of the balloon (240). Further, an outer peripheral side of the side wall (270) is provided with a flow path (290) for a fluid (typically a gas such as air) that can enter and exit through a fluid port (280).

A method of using the balloon chuck (200) is now described. The pillar-shaped honeycomb structure (100) is inserted into the hollow portion (230) through the first opening (210) or the second opening (220). Then, when the fluid (typically a gas such as air) is fed from the fluid port (280) to the flow path (290), the fluid is injected into the balloon (240) through the through holes (260). As a result, when the balloon (240) expands toward the pillar-shaped honeycomb structure (100) inserted into the hollow portion (230), the pillar-shaped honeycomb structure (100) is fixed to the balloon chuck (200) by the pressing force from the balloon (240).

From the viewpoint of improving a light shielding property, it is desirable that when a coordinate axis is taken in the height direction (a length direction from the first end face to the second end face) of the pillar-shaped honeycomb structure (100), and a coordinate value at the second end face (106) is zero and a coordinate value at the first end face (104) is 100, the light shielding annular member (15) circumferentially covers the outer peripheral side surface (102) at any coordinate value of at least 0 to 50, and preferably at least 0 to 20, and more preferably 0 to 10. By circumferentially covering the outer peripheral side surface (102) on the side close to the second end face (106) with the light shielding annular member (15), the sneaking of the light from the light irradiator (12) can be effectively suppressed when the pattern of the transmitted light from the second end face (106) is imaged with the camera (16). In addition to this, it is more desirable that the light shielding annular member (15) circumferentially covers the outer peripheral side surface (102) at any coordinate value of at least 50 to 100, and preferably at least 80 to 100, and more preferably at least 90 to 100. As used herein, the light shielding property is a concept including a light-reducing property, but the light shielding annular member (15) preferably has a light blocking percentage of 60% or more, and more preferably 80% or more, and even more preferably 99% or more, as defined in JIS L 1055: 2009.

By the above method, the plugged portions (109) on one end face of the pillar-shaped honeycomb structure (100) can be inspected. In order to inspect the plugged portions (109) on the other end face, the pillar-shaped honeycomb structure (100) may be turned upside down and the same inspection may be performed.

DESCRIPTION OF REFERENCE NUMERALS 10 inspection system
12 light irradiator
12a light source
13 housing
14 Light diffusing film
15 light shielding annular member
16 camera
17 lens
18 tensioner
19 transparent plate
20 translucent substrate
21 light shielding member
100 pillar-shaped honeycomb structure
102 outer peripheral wall
104 first end face
106 second end face
108 first cell
109 plugged portion
110 second cell
112 partition wall
200 balloon chuck
210 first opening
220 second opening
230 hollow portion
240 balloon
260 through hole
270 side wall
280 fluid port
290 flow path

The invention claimed is:

1. A method for inspecting a pillar-shaped honeycomb structure, the pillar-shaped honeycombs structure comprising: an outer peripheral side wall; a plurality of first cells arranged on an inner peripheral side of the outer peripheral side wall, each of the first cells extending from a first end face to a second end face, the first end face being opened and the second end face having plugged portions; and a plurality of second cells arranged on the inner peripheral side of the outer peripheral side wall, each of the second cells extending from the first end face to the second end face, the first end face having plugged portions and second end face being opened, the first cells and the second cells being alternately arranged adjacent to each other interposing a partition wall therebetween, the method comprising the steps of:

imaging a pattern of transmitted light from the second end face according to arrangement of the plugged portions of the first cells and the second cells, with a camera via a light diffusing film having a diffusion angle of from 10° to 30° placed parallel to the second end face in a non-contact state with the second end face, which pattern is obtained by irradiating the first end face with light; and detecting a defective plugged portion(s) of the second cells based on an image of the pattern of transmitted light imaged with the camera.

2. The method according to claim 1, wherein the light diffusing film has a diffusion angle of from 20° to 30°.

3. The method according to claim 1, wherein the light diffusing film has a thickness of 50 mm or less.

4. The method according to claim 1, wherein the step of imaging the pattern with the camera is carried out under at least one of the following conditions (a) to (c):

(a) tensile stress is applied to the light diffusing film;
(b) the light diffusing film is sandwiched between two transparent plates; and
(c) the light diffusing film is attached to a transparent plate.

5. The method according to claim 1, wherein a distance between the light diffusing film and the second end face is from 1 mm to 100 mm.

6. The method according to claim 1, wherein the light with which the first end face is irradiated is diffused light.

7. The method according to claim 1, wherein the light with which the first end face is irradiated is emitted from a light source facing the first end face and spreading over an area larger than that of the first end face.

8. The method according to claim 1, wherein the light with which the first end face is irradiated is emitted from a light source that is in contact with the pillar-shaped honeycomb structure.

9. The method according to claim 1, wherein the light with which the first end face is irradiated is emitted through a translucent substrate arranged between the pillar-shaped honeycomb structure and the light source.

10. A system for inspecting a pillar-shaped honeycomb structure, the pillar-shaped honeycombs structure comprising: an outer peripheral side wall; a plurality of first cells arranged on an inner peripheral side of the outer peripheral side wall, each of the first cells extending from a first end face to a second end face, the first end face being opened and the second end face having plugged portions; and a plurality of second cells arranged on the inner peripheral side of the outer peripheral side wall, each of the second cells extending from the first end face to the second end face, the first end face having plugged portions and second end face being opened, the first cells and the second cells being alternately arranged adjacent to each other interposing a partition wall therebetween, the system comprising:

a light irradiator for irradiating the first end face with light;

a light diffusing film to be arranged in parallel to the second end face in a non-contact state with the second end face, wherein the light diffusing film has a diffusion angle of from 10° to 30°; and a camera for imaging, via the light diffusing film, a pattern of transmitted light from the second end face according to arrangement of each of the plugged portions of the first cells and the second cells, which pattern is obtained by irradiating the first end face with the light.

11. The system according to claim 10, wherein the light diffusing film has a diffusion angle of from 20° to 30°.

12. The system according to claim 10, wherein the light diffusing film has a thickness of 50 mm or less.

13. The system according to claim 10, wherein the system comprises at least one of the following parts (a) to (c):
   (a) a tensioner for applying tensile stress to the light diffusing film, the tensioner comprising at least one pair of grippers;
   (b) two transparent plates for sandwiching the light diffusing film; and
   (c) a transparent plate for attaching the light diffusing film.

14. The system according to claim 10, wherein the camera is configured to image the pattern of transmitted light from the second end face under a condition that a distance between the light diffusing film and the second end face is from 1 mm to 100 mm.

* * * * *